(12) United States Patent
Marks, Jr.

(10) Patent No.: US 6,962,313 B1
(45) Date of Patent: Nov. 8, 2005

(54) CAMERA SUPPORT ASSEMBLY AND ACTUATOR

(75) Inventor: Franklin J. Marks, Jr., Howard, PA (US)

(73) Assignee: Wintron Technologies Inc., Howard, PA (US)

(*) Notice: Subject to any disclaimer, the term of this patent is extended or adjusted under 35 U.S.C. 154(b) by 89 days.

(21) Appl. No.: 10/065,747

(22) Filed: Nov. 14, 2002

Related U.S. Application Data

(60) Provisional application No. 60/336,374, filed on Nov. 15, 2001, provisional application No. 60/356,182, filed on Feb. 12, 2002, provisional application No. 60/357,933, filed on Feb. 19, 2002.

(51) Int. Cl.[7] ............................................. F16L 11/00
(52) U.S. Cl. ..................................... 248/200; 348/148
(58) Field of Search ............................... 248/200, 129; 359/872, 876, 877; 348/148; 362/109

(56) References Cited

U.S. PATENT DOCUMENTS

| | | | | |
|---|---|---|---|---|
| 4,039,818 A | * | 8/1977 | Hickman | .................... 362/139 |
| 5,305,356 A | * | 4/1994 | Brooks et al. | ............... 376/249 |
| 5,707,014 A | * | 1/1998 | Chan et al. | .................. 239/754 |
| 5,959,792 A | * | 9/1999 | Ibrahim | ....................... 359/872 |
| 6,091,453 A | * | 7/2000 | Coan et al. | .................. 348/373 |
| 6,193,386 B1 | * | 2/2001 | Reynolds | ..................... 362/109 |
| 6,210,009 B1 | * | 4/2001 | Daly | ........................... 359/882 |
| 6,761,474 B1 | * | 7/2004 | Race | ........................... 362/486 |
| 2002/0097321 A1 | * | 7/2002 | McBride | ..................... 348/148 |

FOREIGN PATENT DOCUMENTS

| | | | |
|---|---|---|---|
| EP | 623814 A2 | * | 11/1994 |
| GB | 2235972 A | * | 3/1991 |
| JP | 10197803 A | * | 7/1998 |

* cited by examiner

Primary Examiner—Anita M. King
(74) Attorney, Agent, or Firm—John J. Elnitski, Jr.

(57) ABSTRACT

A camera support and actuator including a Z-shape rod, a camera, an actuator and a skid plate. The Z-shape rod includes a handle section at a top, a camera support section at a bottom and a middle section between the handle and camera support sections. The handle and camera support sections being approximately parallel to a surface and the middle section extending upward from the camera support section to the handle section. The camera is mounted to the camera support section. The actuator is mounted on the handle section to cause movement of the camera. The actuator includes a shaft internal to the handle section of the Z-shaped rod and is connected to the camera by a cable to cause movement of the camera. The actuator includes a handle to allow the shaft to be push and pulled inside the handle section to control movement of the camera. The skid plate is attached to a bottom of the camera support section to support the camera support section above the surface and allow the camera support section to slide over the surface.

26 Claims, 22 Drawing Sheets

CAMERA SUPPORT ASSEMBLY AND ACTUATOR

CROSS REFERENCE TO RELATED APPLICATIONS

This application claims the benefit of and incorporates by reference U.S. Provisional Application Nos.: 60/336,374 filed Nov. 15, 2001, 60/356,182 filed Feb. 12, 2002 and 60/357,933 filed Feb. 19, 2002.

BACKGROUND OF INVENTION

The present invention generally relates to camera supports used for looking under objects. More specifically, the present invention relates to a camera support assembly and actuator to aid in looking under objects such as automobiles for security reasons.

There are many different types of camera devices which are available to look under objects such as automobiles. Most of these devices lack ease of use when trying to move a camera support under an object, while at the same time allowing the user to manipulate the camera in other directions in order to obtain an accurate view of the bottom of an object.

It is an object of the present invention to provide a camera support and actuator that allows the user to easily rotate a camera while moving the camera support under an object.

SUMMARY OF INVENTION

A camera support and actuator including a Z-shape rod, a camera, an actuator and a skid plate. The Z-shape rod includes a handle section at a top, a camera support section at a bottom and a middle section between the handle and camera support sections. The handle and camera support sections being approximately parallel to a surface and the middle section extending upward from the camera support section to the handle section. The camera is mounted to the camera support section. The actuator is mounted on the handle section to cause movement of the camera. The actuator includes a shaft internal to the handle section of the Z-shaped rod and is connected to the camera by a cable to cause movement of the camera. The actuator includes a handle to allow the shaft to be push and pulled inside the handle section to control movement of the camera. The skid plate is attached to a bottom of the camera support section to support the camera support section above the surface and allow the camera support section to slide over the surface.

DETAILED DESCRIPTION

Figure 1:
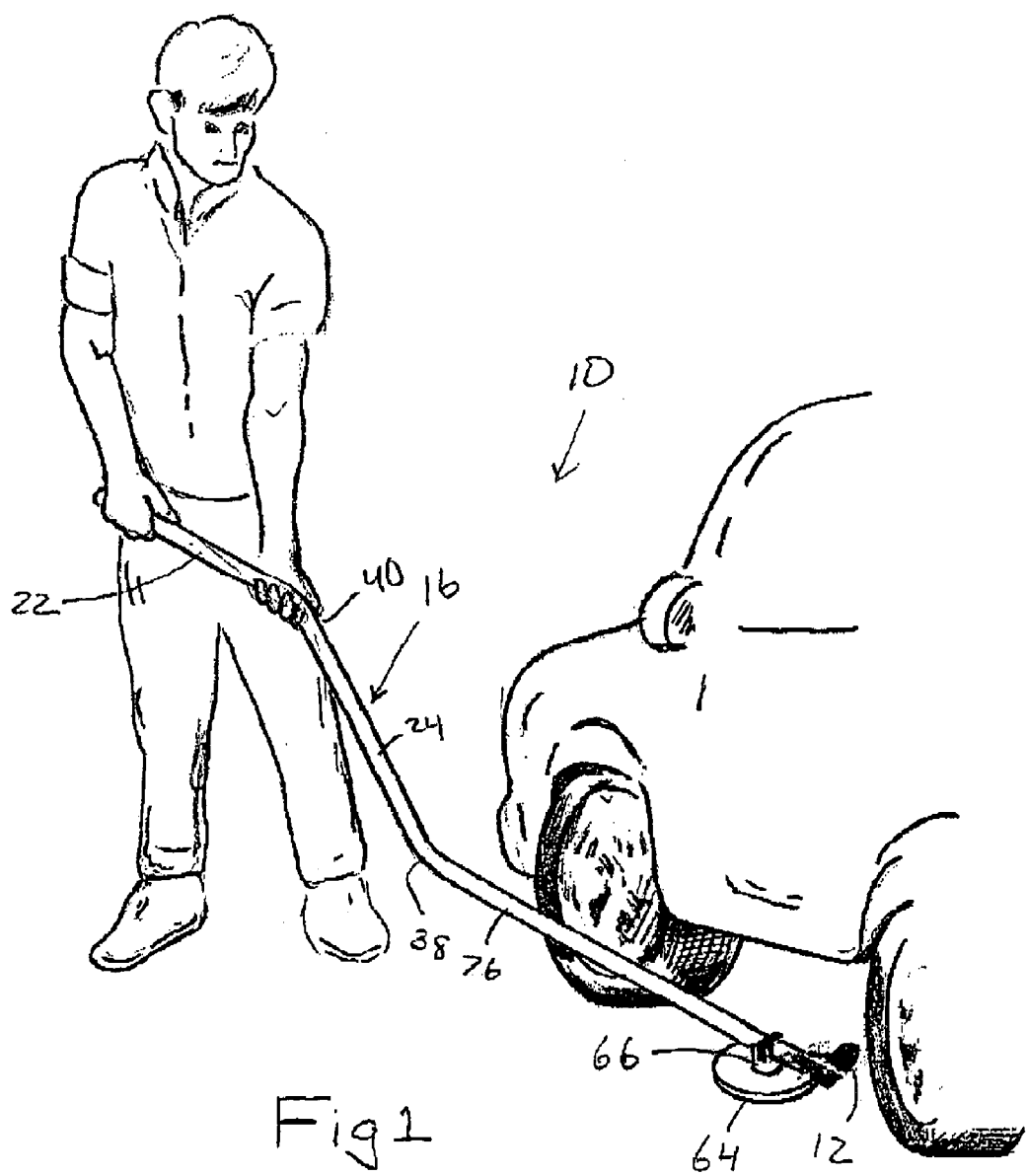
FIG. 1 is a perspective view of a camera support and actuator according to the present invention.

The present invention is a camera support assembly 10 for holding a camera 12 in position and an actuator 14 for moving the camera 12. FIGS. 1–15 show the camera support assembly 10, which is used to hold the camera 12 in position. FIGS. 16–21 show the actuator 14, which is used to rotate the camera 12 that is attached to the camera support assembly 10. The camera support assembly 10 is very useful for security personnel to view the underneath of a vehicle, as shown in FIG. 1. The camera support assembly 10 is show in FIG. 1 being held by the user, while the camera 12 is slid under the vehicle. The user can view the underneath of the vehicle using a display (not shown) that is in view of the user and is connected to the camera 12. The camera support assembly 10 allows viewing of the underneath of the vehicle, while the user remains in a standing position. The actuator 14 allows the user to rotate the camera 12 upward to view the underneath of the vehicle.

Figure 2:
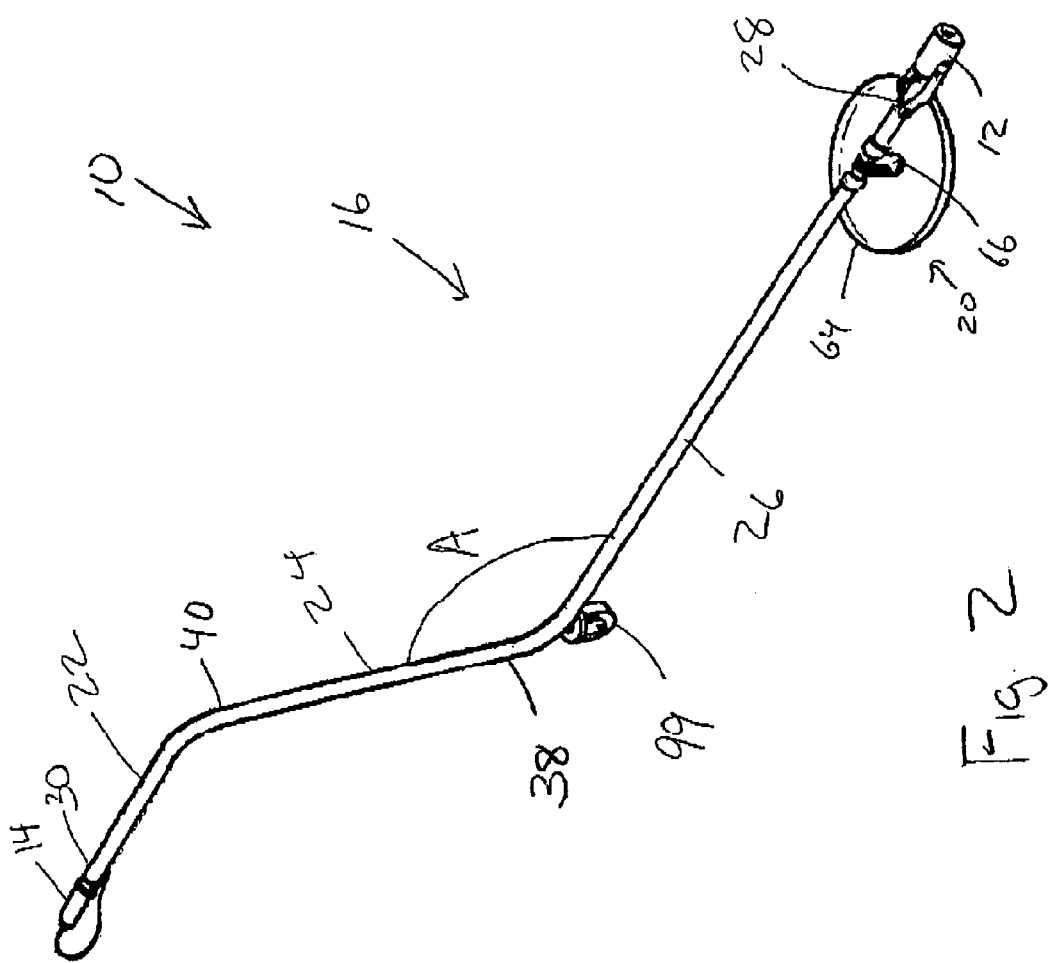
FIG. 2 is a perspective view of a camera support and actuator according to the present invention.
Figure 3:
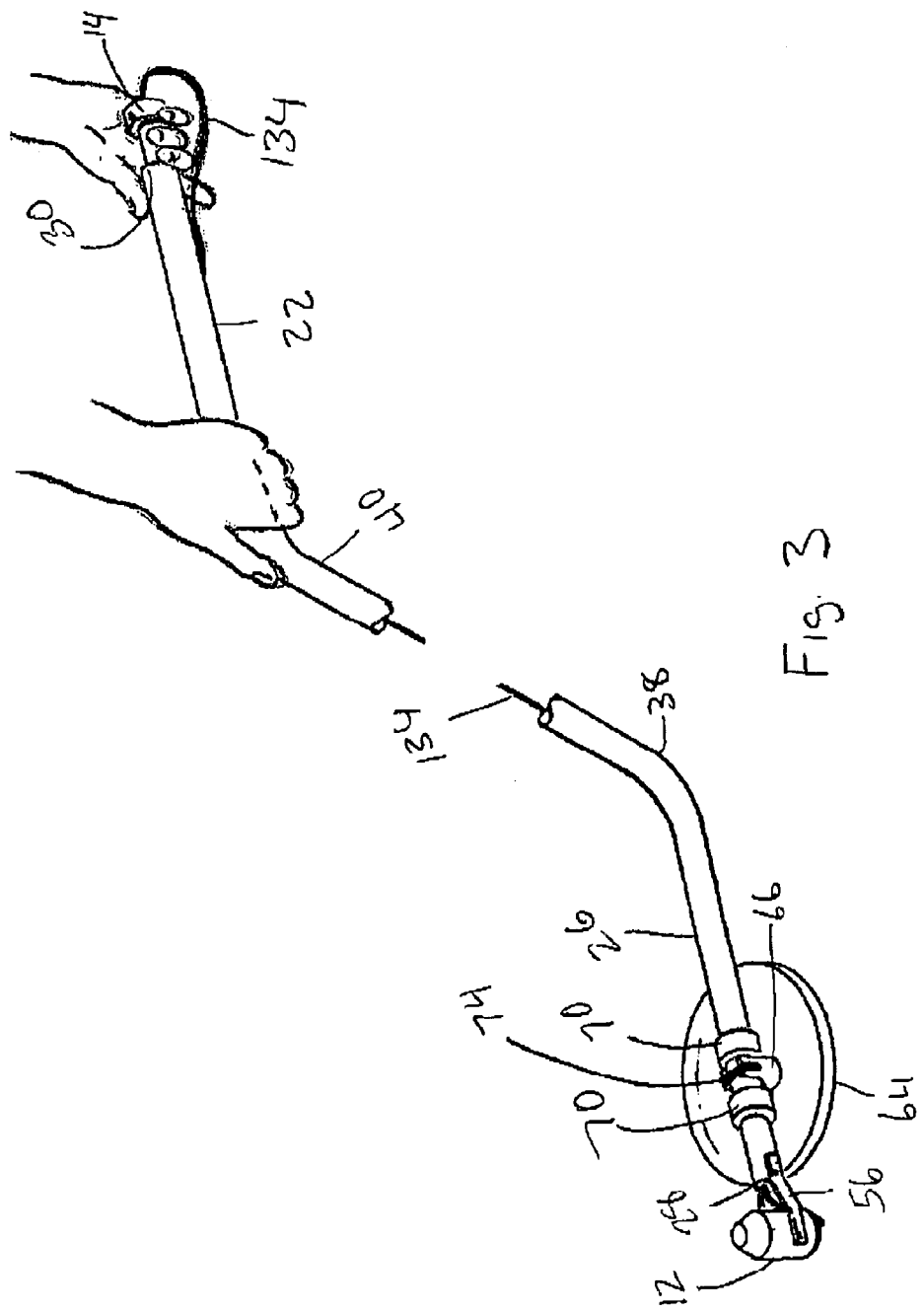
FIG. 3 is a perspective view of a camera support and actuator according to the present invention.
Figure 4:
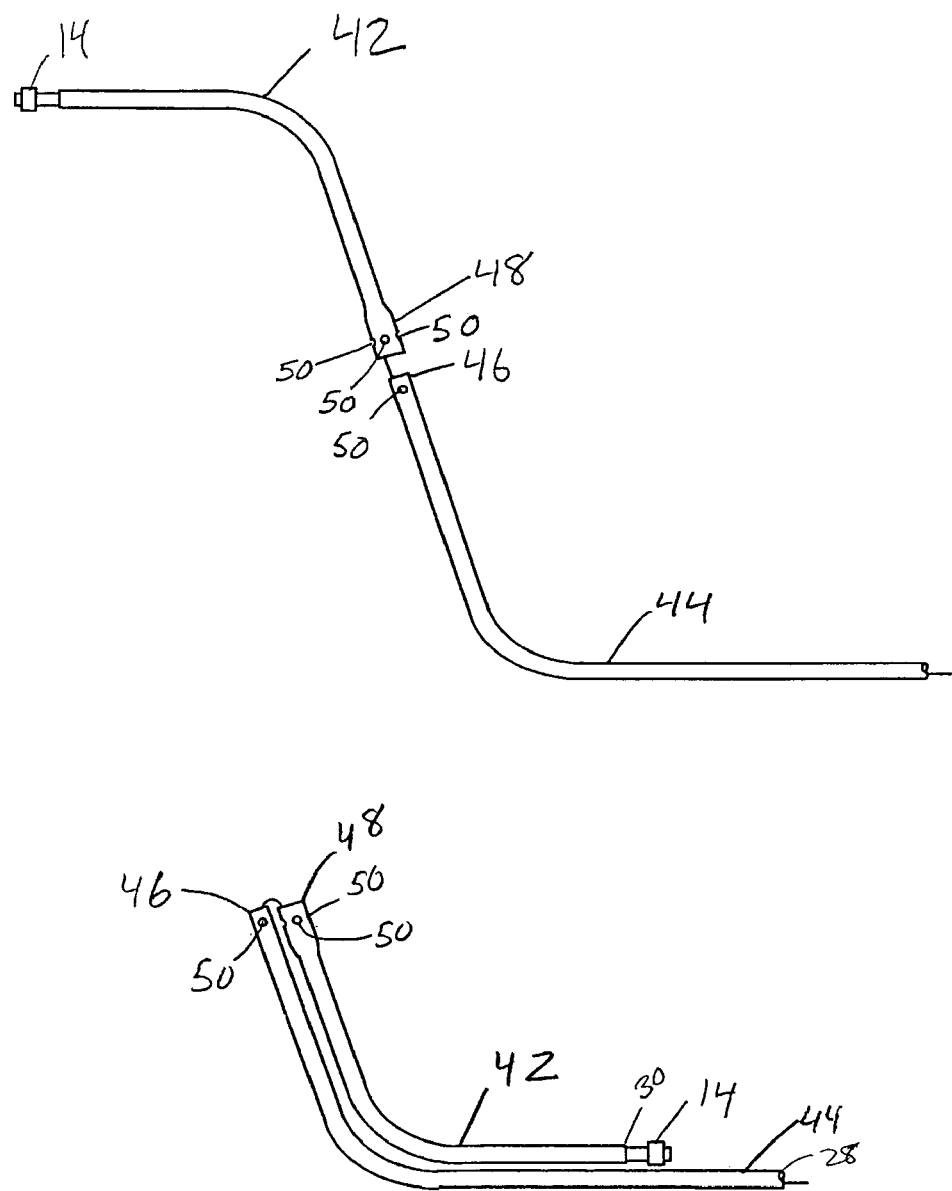
FIG. 4 is a side view of a two piece Z-shaped rod according to the present invention.
Figure 5:
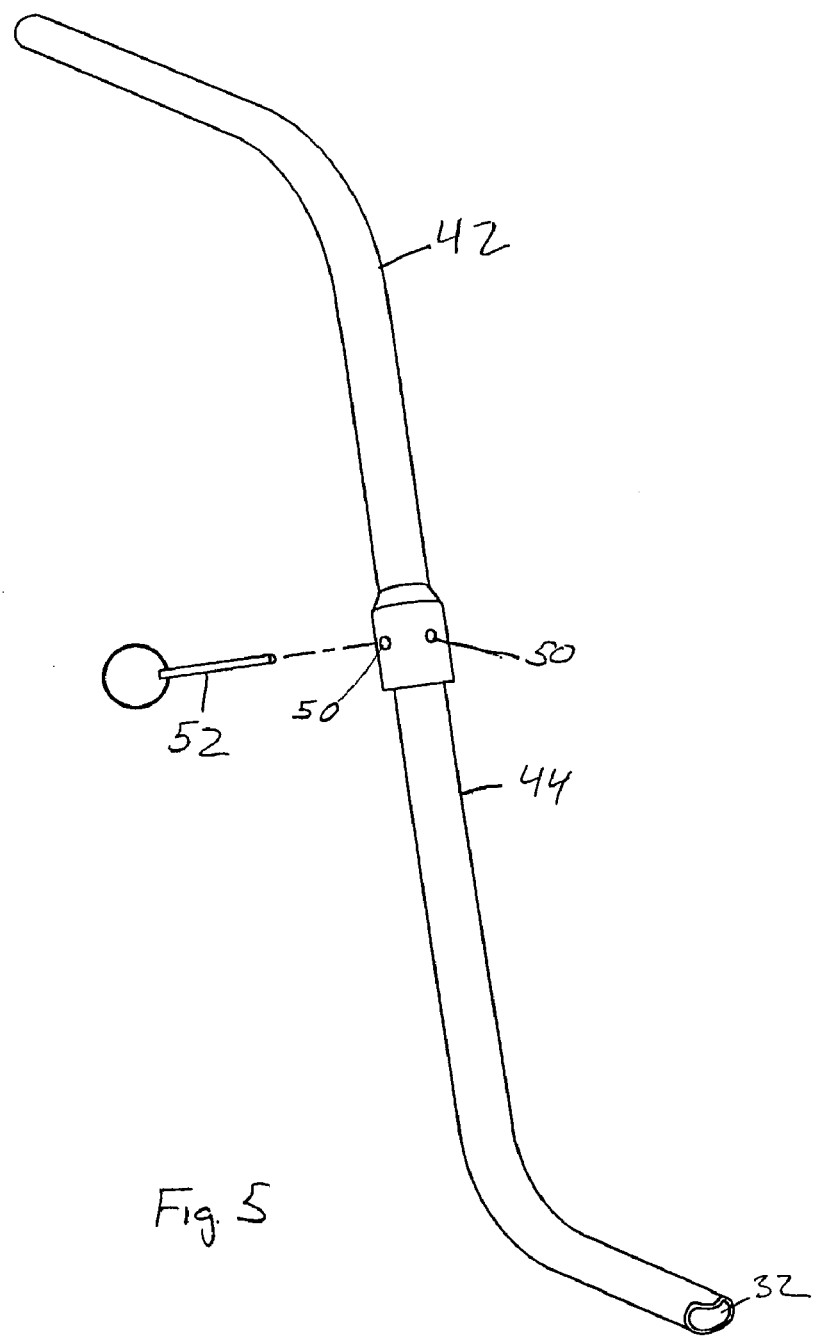
FIG. 5 is a perspective view of a two piece Z-shaped rod according to the present invention.
Figure 6:
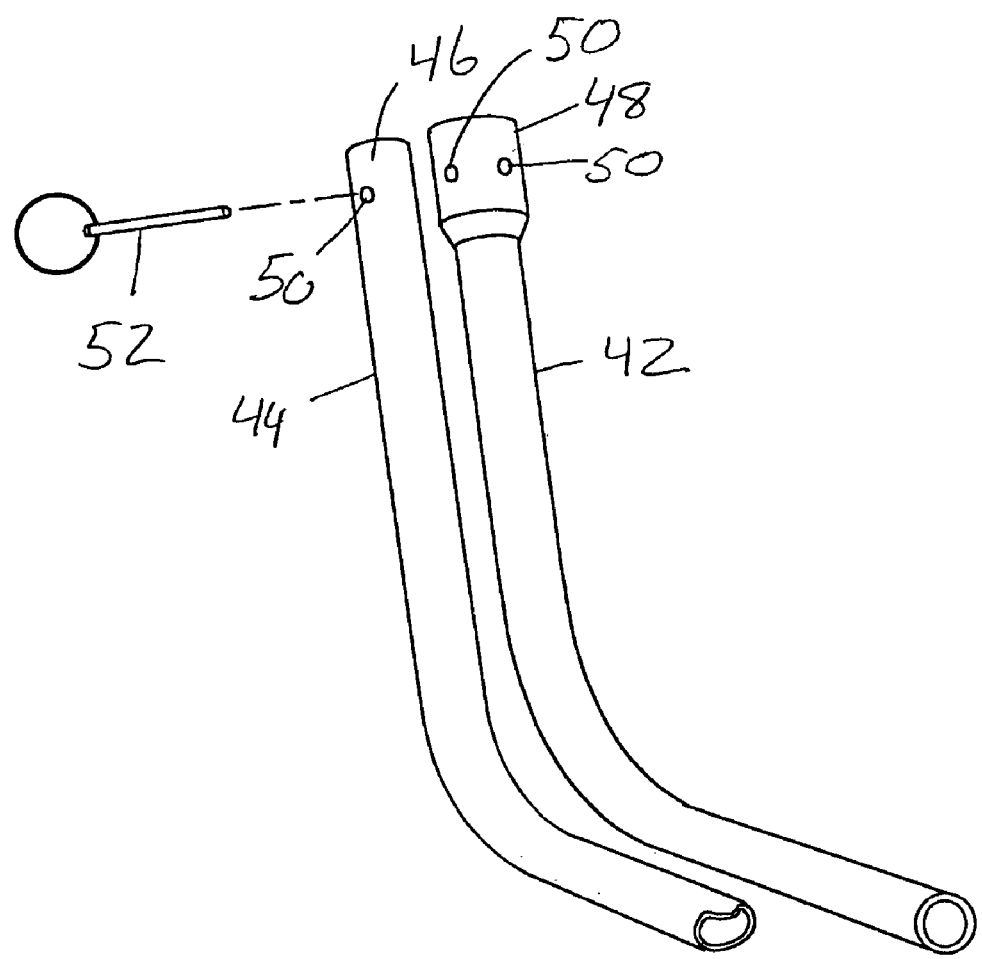
FIG. 6 is a perspective view of a two piece Z-shaped rod according to the present invention.

The camera support assembly 10 includes a Z-shape rod 16, a camera support 18 and a rod support guide 20, as shown in FIGS. 1–3. The Z-shape rod 16 includes a handle section 22, a middle section 24 and a camera support section 26. The handle, middle and camera support sections 22, 24, 26 together form the Z-shape of the Z-shape rod 16. The Z-shape rod 16 has a bottom end 28 at the camera support section 26 and a top end 30 at the handle section 22. The Z-shape rod 16 is hollow, which forms a rod passage 32 from a bottom opening 34 at the bottom end 28 to a top opening 36 at the top end 30. The Z-shape rod 16 is hollow to allow wiring needed for the camera 12 to run from the camera 12, through the Z-shape rod 16, and out the handle section 22.

The camera support section 26 is the lower section of the three sections and closely parallels the ground as shown in FIGS. 2–8. The camera support section 26 supports the camera 12 at about ground level, so that the camera 12 may be slid underneath the vehicle. The middle section 24 extends upward from the camera support section 26 at a bottom 38 of the middle section 24. The middle section 24 provides control of movement of camera support section 26 by being connected between the handle and camera support sections 22, 26. As shown in FIG. 2, the angle "A" between the middle and camera support sections 24, 26 is shown to be more than ninety degrees (90°). The angle A is more than ninety degrees (90°) to prevent the middle section 24 from contacting and damaging the side of the vehicle, as the camera 12 attached to the camera support assembly 10 is moved around under the vehicle. The handle section 22 extends from a top 40 of the middle section 24, away from the camera support section 26. The handle section 22 approximately runs in a parallel direction to the camera support section 26. The handle section 22 is shown with the actuator 14 on the end of the handle section 22 for rotating the camera 12.

Figure 7:
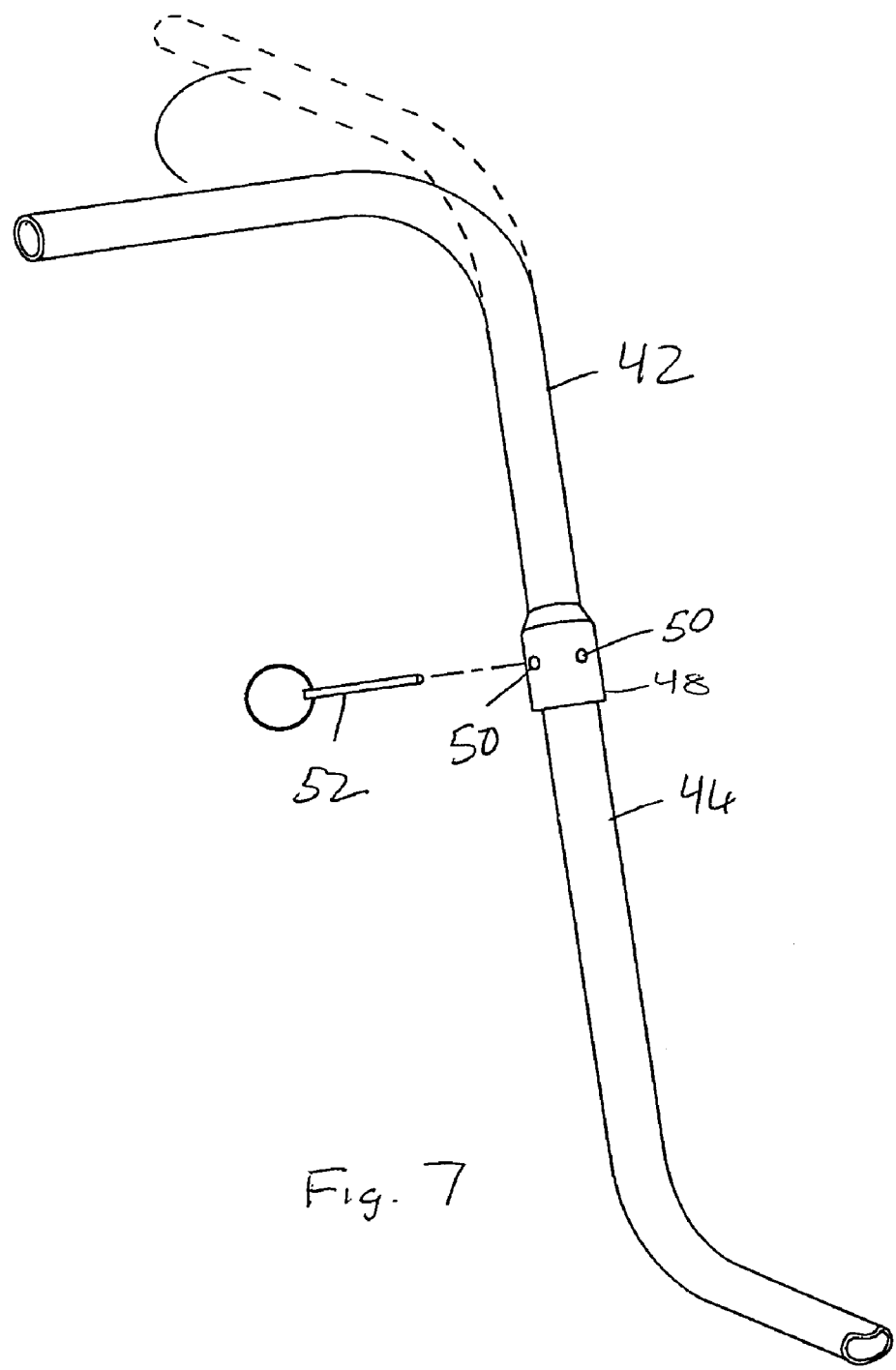
FIG. 7 is a perspective view of a two piece Z-shaped rod according to the present invention.
Figure 8:
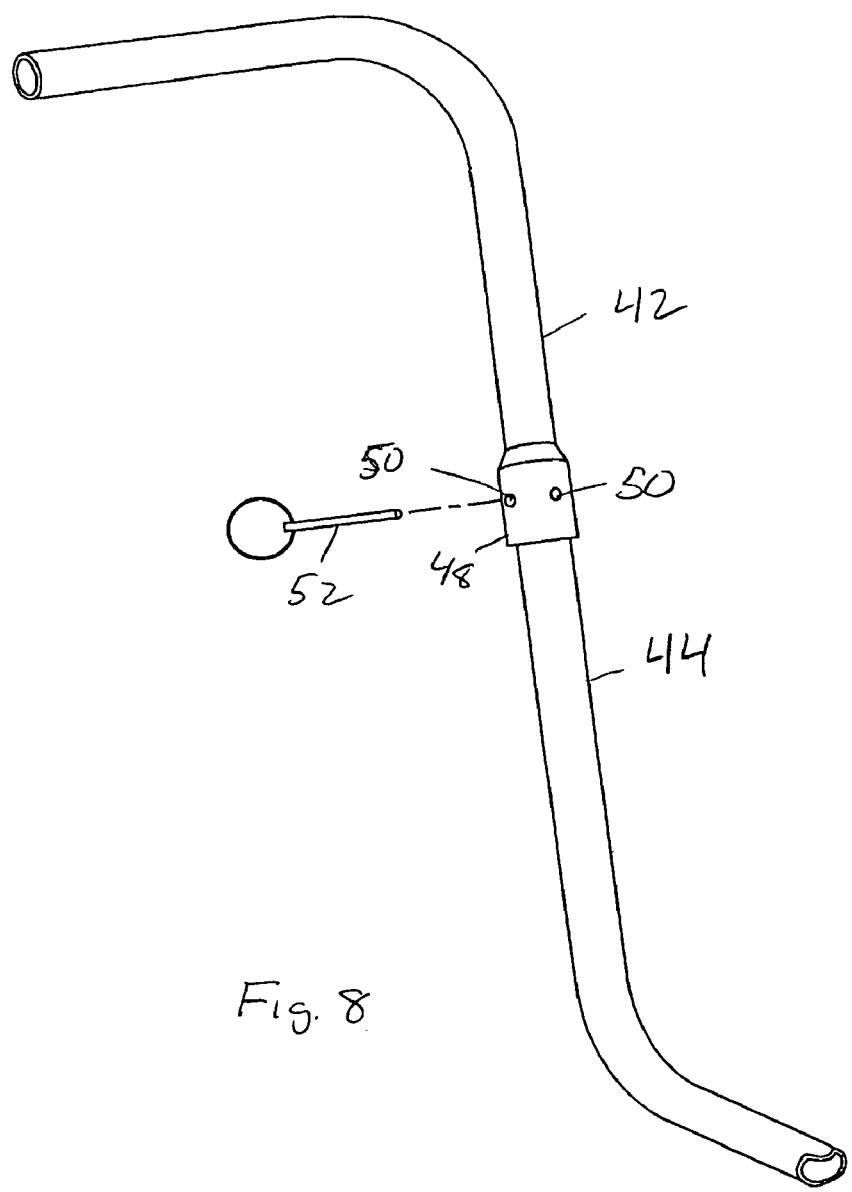
FIG. 8 is a perspective view of a two piece Z-shaped rod according to the present invention.

FIGS. 4–8 show a two piece Z-shape rod 16 designed to break down for ease of transport. The Z-shape rod 16 breaks down at the middle section 22 at about the midway point of the middle section 22, forming a handle section piece 42 and a camera section piece 44. The handle section piece 42 includes a female end 48 at the middle section 22. The camera section piece 44 includes a male end 46 at the middle section 22. The female end 48 inserts over the male end 46 to assemble the two pieces of the Z-shape rod 16. The female end 48 includes a plurality of pairs of aligned holes 50 aligned to receive a quick release pin 52. The male end 46 includes a paired aligned holes 50. When the Z-shape rod 16 is assembled, one set of the pairs of aligned holes 50 of the female end 48 are aligned with the pair of aligned holes 50 of the female end 46. The quick release pin 52 is inserted into all of the aligned holes 50 of the two assembled pieces to secure the two pieces of the Z-shape rod 16 together. The plurality of pairs of aligned holes 50 allows different positioning of the handle section piece 43 in relation to the camera section piece 44, as shown in FIGS. 7–8.

Figure 9:
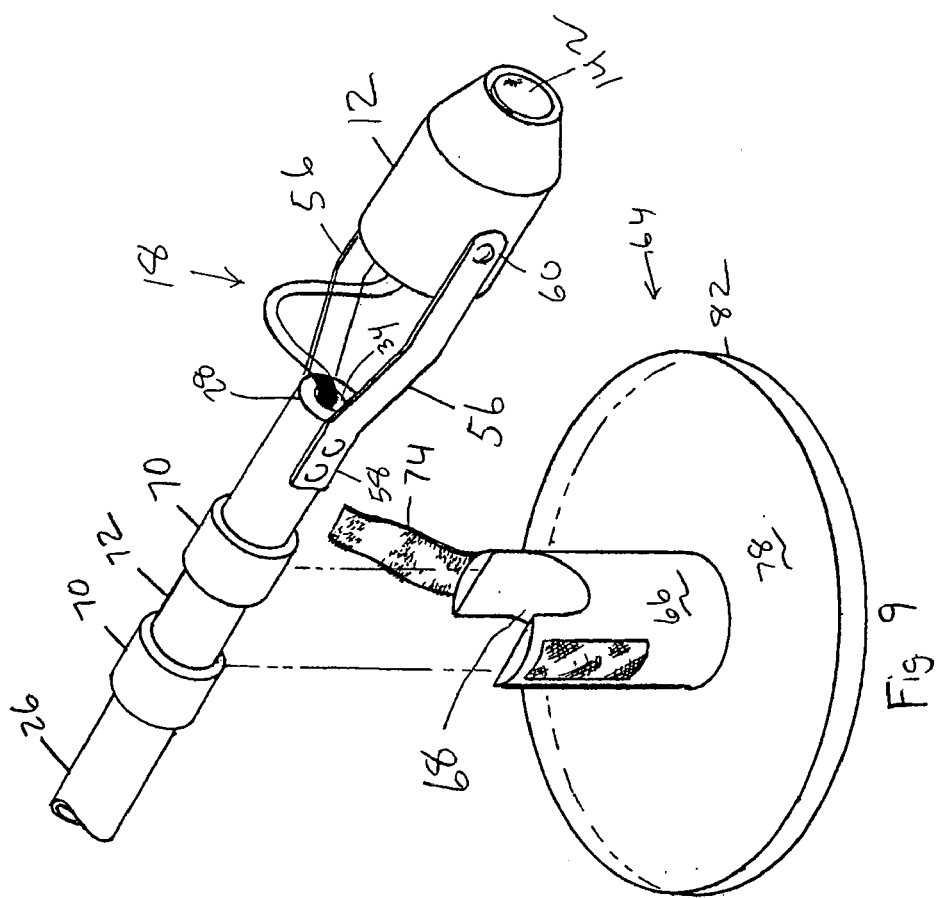
FIG. 9 is a perspective view of a skid plate according to the present invention.
Figure 10:
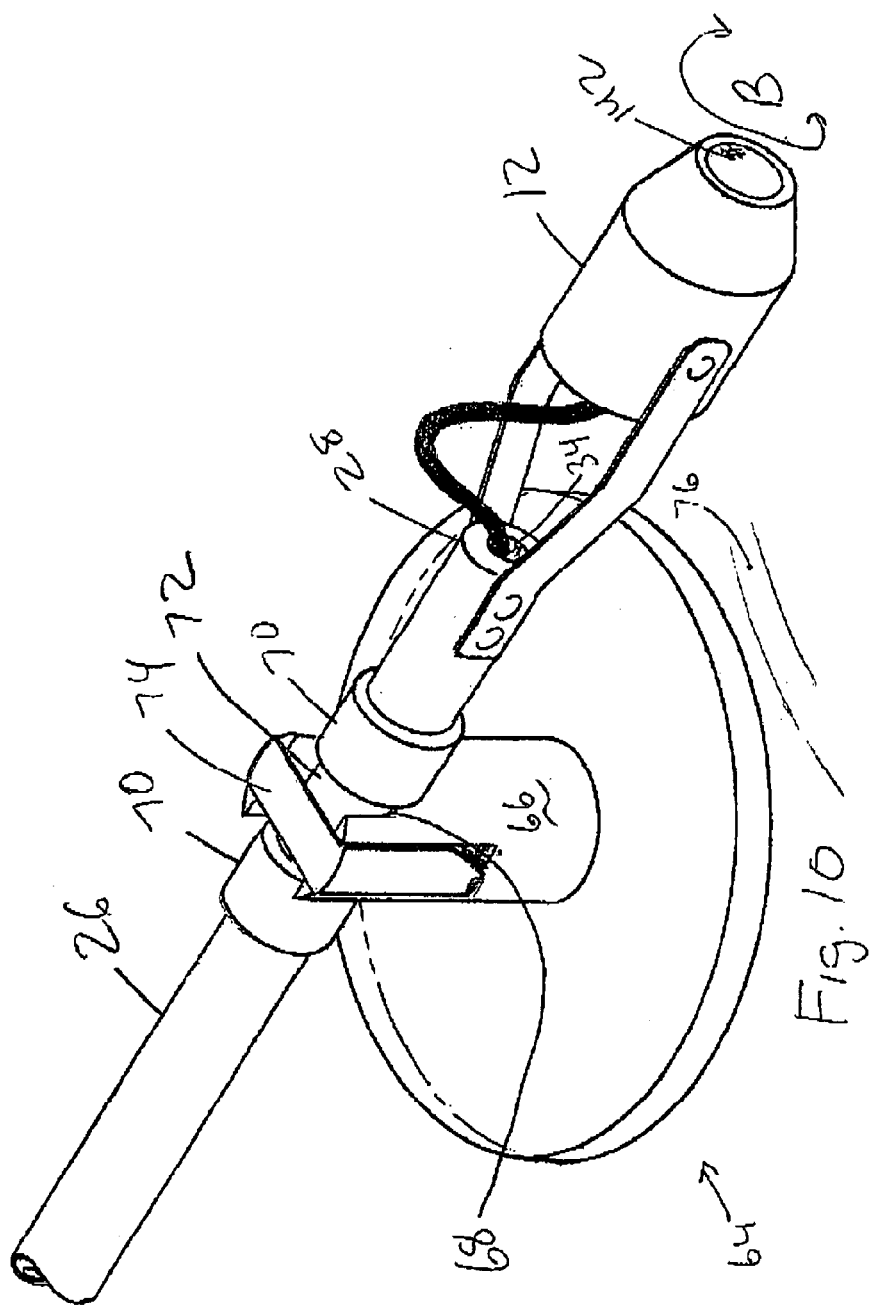
FIG. 10 is a perspective view of a skid plate according to the present invention.

The camera support 18 is connected to the bottom end 28 at the camera support section 26, as shown in FIG. 9. The camera support 18 is shown as two brackets 56. Each bracket 56 has a first end 58 secured to the bottom end 54 at the camera support section 26, while a second end 60 of each bracket 56 holds the camera 12. The camera 12 is rotatably mounted to the second ends 60 of the brackets 56 to allow rotation of the camera 12 by the actuator 14. A wire 62 is shown extending from the camera 12 and into the bottom opening 34 of the bottom end 28 at the camera support section 26. The rod support guide 20 is shown in detail in FIGS. 9–12. The rod support guide 20 includes a skid plate 64 and a support column 66. The support column 66 extends upward from the center of the skid plate 64 and supports the bottom end 28 of the Z-shape rod 16 at the camera support section 26. The support column 66 is shown having a U-shape cutout 68 at a top of the support column 66. The U-shape cutout 68 acts as a cradle to bold the camera support section 26 above the skid plate 64. The camera support section 26 includes two cradle collars 70 attached near the bottom end 28 at the camera support section 26. The two cradle collars 70 create a cradle section 72 along the camera support section 26, which is between the two cradle collars 70. The cradle section 72 is placed in the U-shape cutout 68. A strap 74 is used to accure the camera support section 26 in the U-shape cutout 68, which hi turns retains the skid plate 64 to the Z-shape rod 16. The straps 74 retains the camera support section 26, yet allows rotation about the cradle section 72 of the camera support section 26. The camera 12 can be rotated in the B direction by moving the handle section 22 left or right, when the skid plate 64 is resting against a surface 76, as shown in FIG. 10. The straps 74 is fastened to the sides of the support column 66 using hook and loop fasteners on the ends of the straps 74 and on the support column 66. The cradle collars 70 attached to the camera support section 26 are used to prevent forward or reward movement of the camera support section 26 in the U-shape cutout 68.

Figure 11:
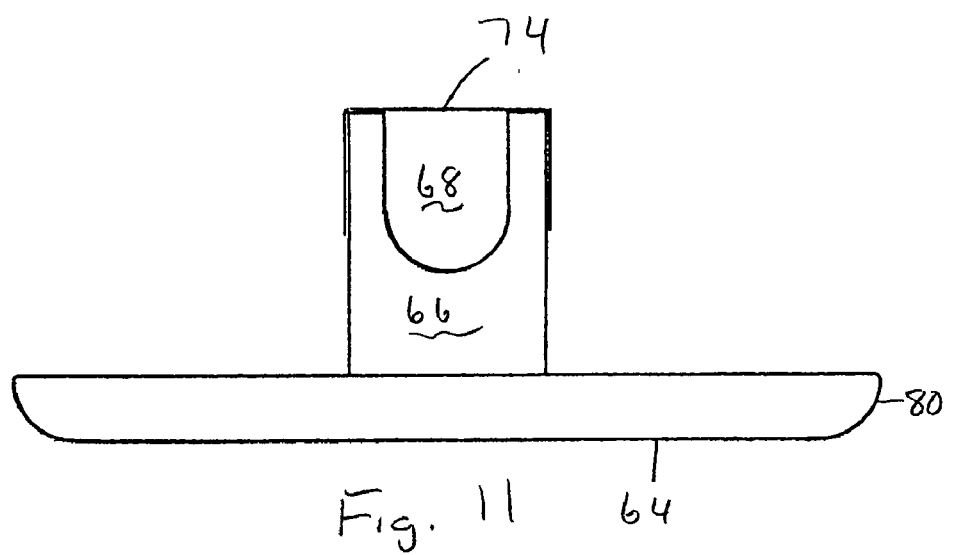
FIG. 11 is a side view of a skid plate according to the present invention.
Figure 12:
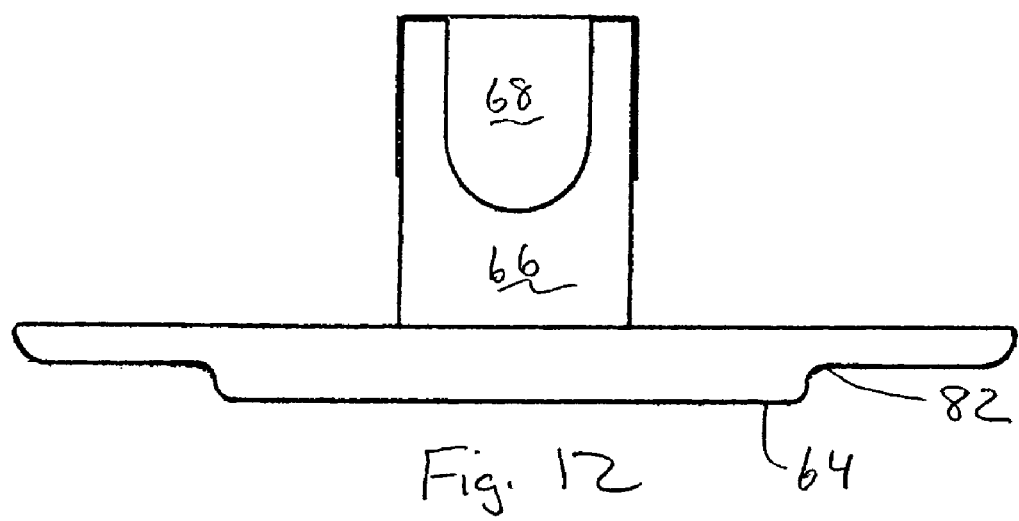
FIG. 12 is a side view of a skid plate according to the present invention.

FIGS. 10, 11–12 show three of the many possible shapes for the skid plate 64. FIGS. 10, 1.1–12 shows a round plate 78 with an upright edge 80. FIG. 11 shows the skid plate 64 similar to FIG. 10, but having a more radiused transition between the round plate 78 and the upright edge 80. FIG. 12 shows the skid plate 64 similar to FIG. 10, but having a bell shaped upright edge 82 emanating from a smaller round plate 78. The there are many more shapes for the skid plate 64, but the round plate 78 with an upright edge 80 encompassing the round plate 78 seems to work the best. The round plate 78 supports the camera support section 26 and thereby the entire Z-shape rod 16 above and against the ground. The support of the camera support section 26 against the ground by the round plate 78 alleviates the user from holding the entire weight of the camera support assembly 10 and the actuator 14. The encompassing upright edge 80 provides a surface which first contacts any obstructions on the ground such as small rocks or uneven ground surfaces and aids the skid plate 64 in riding over the obstruction. The more radiused the transition from the round plate 78 to the upright edge 80, the easier the skid plate 64 will ride over the obstruction.

Figure 13:
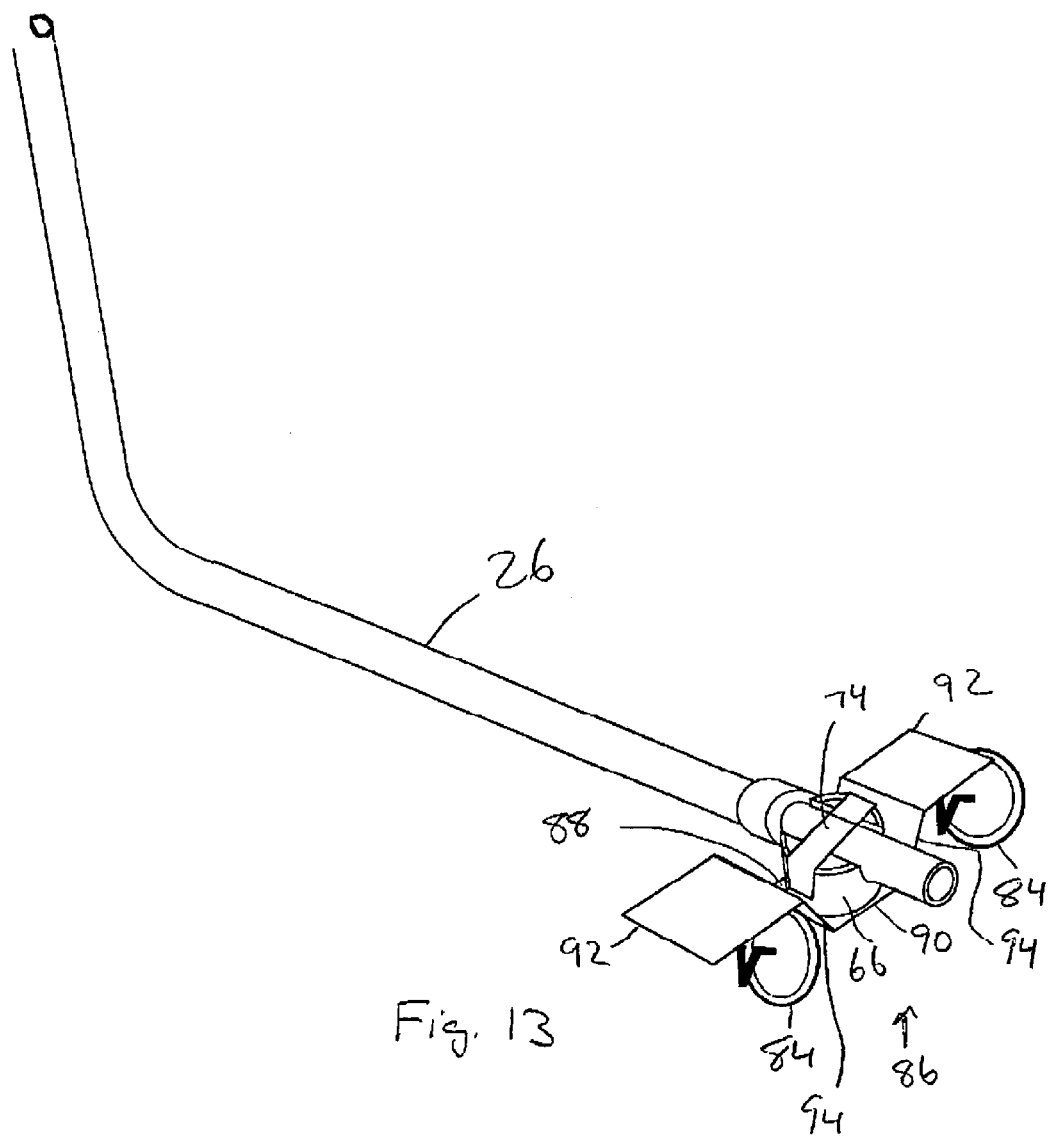
FIG. 13 is a perspective view of a skid plate with wheels according to the present invention.
Figure 14:
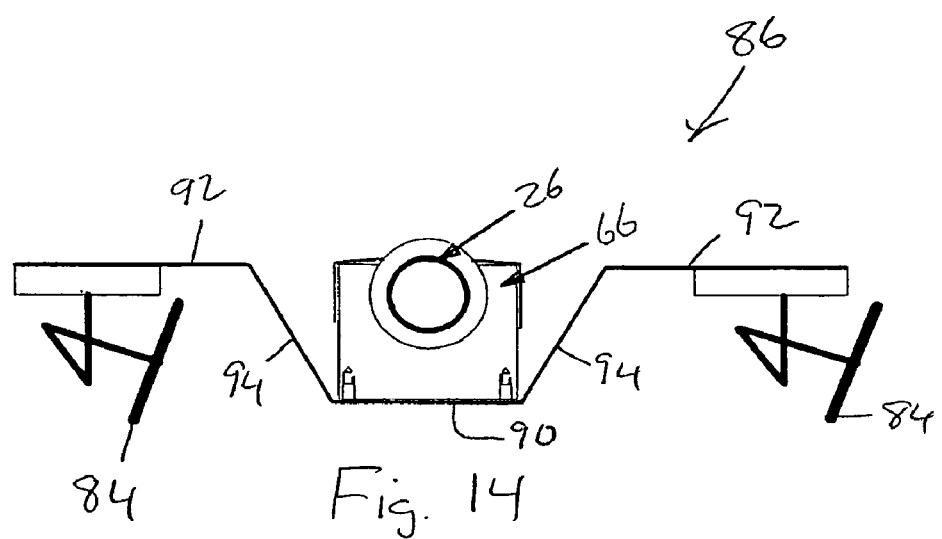
FIG. 14 is a front view of a skid plate with wheels according to the present invention.
Figure 15:
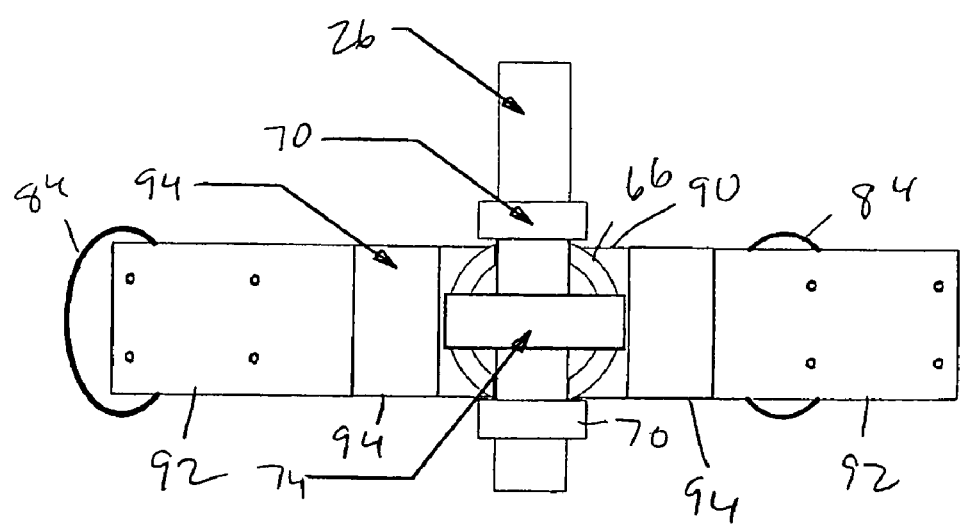
FIG. 15 is a top view of a skid plate with wheels according to the present invention.

FIGS. 13–15 shows an alternative to the skid plate 64 using offset angled casters 84, which allow the degree of movement associated with the skid plate 64, but including the advantages of casters 84. The alternative is a caster skid plate 86 as show in FIGS. 13–15. The caster skid plate 86 includes an inverted wing shaped plate 88 attached to the bottom of the support column 66. The support column 66 rests in the middle section 90 of the inverted wing shaped plate 88, which is lower than the outside sections 92 of the inverted wing shaped plate 88. The middle and outside sections 90, 92 are flat surfaces. The middle section 90 is basically parallel to the outside sections 92. The middle section 90 is connected to the outside sections 92 by angled sections 94. Offset angle casters 84 of the type use in creepers used by auto mechanics. The offset angle casters 84 are mounted to the bottom of the outside sections 92 to raise the middle section 90 off of the surface that the caster skid plate 86 is resting upon.

Additionally, a single wheel caster 99 could be incorporated on the Z-shape rod 16. FIG. 2 shows the single wheel caster 99 along the camera support section 26, near the intersection of the middle section 24 and the camera support section 26. The single wheel caster 99 could be used with any of the embodiments of the present invention. The single wheel caster 99 is useful in counteracting any forces the could be applied to the intersection of the middle section 24 and the camera support section 26 during movement of the Z-shape rod 16 along a surface. Thereby, making it easier for the user to manipulate the camera support assembly 10.

Figure 19:
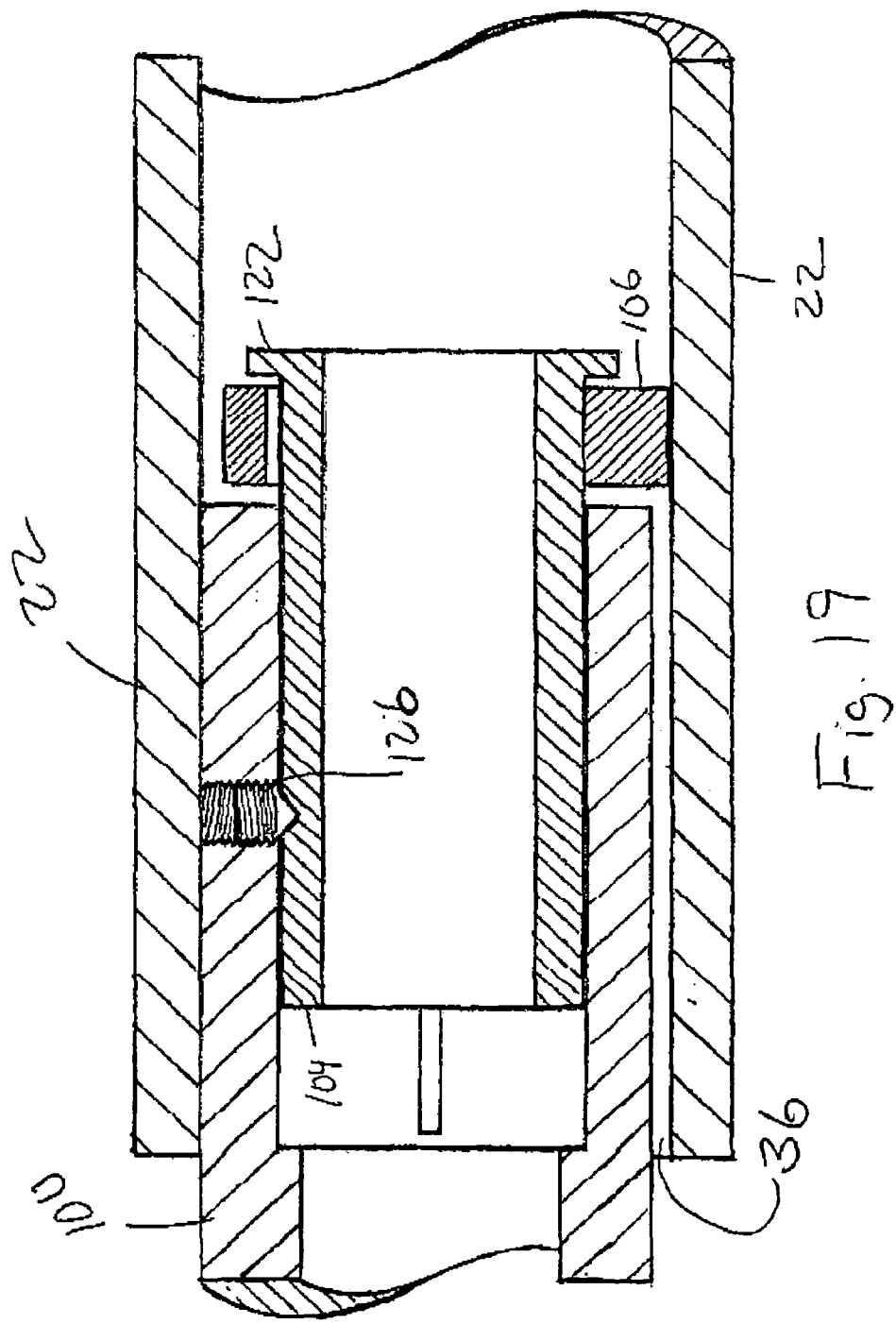
FIG. 19 is a cross-sectional view of an actuator in a handle section according to the present invention.
Figure 20:
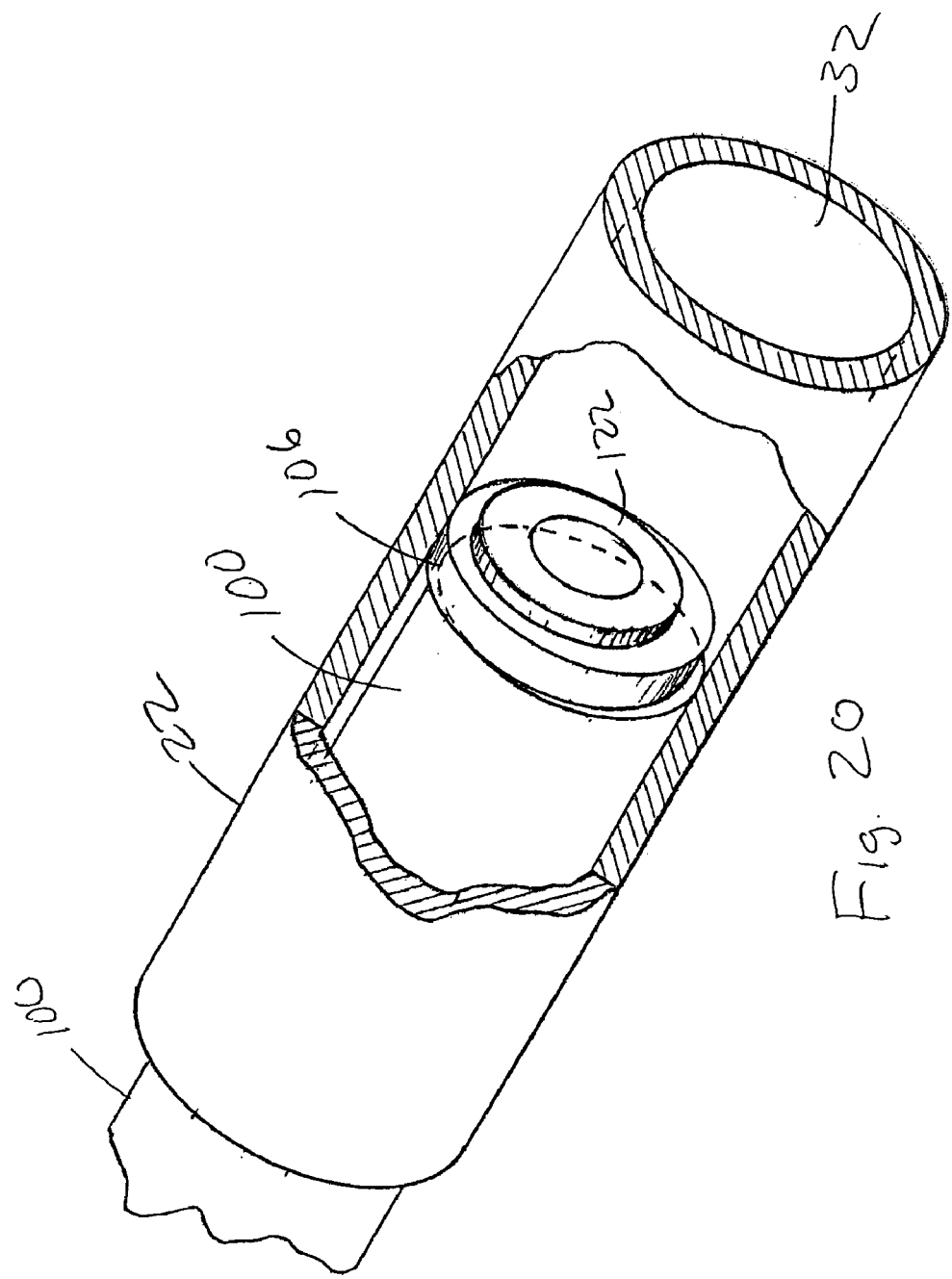
FIG. 20 is a perspective cut-a-way view of an actuator in a handle section according to the present invention.

An actuator 14 is shown at the end of the handle section 22 for rotating the camera 12 upward. Two possible versions of the actuator 14 are shown in FIGS. 16–21, which can be used with the camera support assembly 10. FIGS. 16–20 show the first actuator 14, which includes a actuator shaft 100, clamping collar 102, axle 104 and cam 106. The actuator shaft 100 is sized to slide in and out of the top opening 36 at the top end 30 of the Z-shape rod 16. The actuator shaft 100 has a collar end 108 and a cam end 110. The actuator shaft 100 is hollow with openings at the collar and cam ends 108, 110 to allow the wiring connected to the camera 12 to pass through the actuator shaft 100. The collar end 108 includes a slot 112 formed by removing the material of the actuator shaft 100 in order to form the slot 112. The slot 112 allows the collar end 108 to be squeezed to grip and hold the wiring passing through the actuator shaft 100. The clamping collar 102 slips on the collar end 108 in the area of the slot 112. The clamping collar 102 includes a slot set screw 114 and slot set screw hole 116. When the slot set screw 114 is screwed into the clamping collar 102, the slot set screw 114 applies pressure against the actuator shaft 100, thereby squeezing the collar end 108 between the clamping collar 102 and the slot set screw 114. The openings at the ends 108, 110 of the actuator shaft 100 and the hollow passage in the actuator shaft 100 are offset from the center of the actuator shaft 100. The offset is for use of the cam 106, which allows the actuator 14 to be locked into position in the Z-shape rod 16. The cam 106 is a round disc with an offset cam hole 118 which matches the offset of the opening at the cam end 108 of the actuator shaft 100. The axle 104 is a hollow shaft and includes an axle collar 122. The cam end 108 of the actuator shaft 100 includes a shaft set screw hole 124 and shaft set screw 126. The shaft set screw 126 is screwed into the hollow passage of the actuator shaft 100 via the shaft set screw hole 124. The axle 104 is inserted into the cam hole 18 and then inserted into the hollow passage at the cam end 108 of the actuator shaft 100. The shaft set screw 126 is tightened against the axle 104 to secure the axle 104 in the hollow passage of the actuator shaft 100. The axle 104 is positioned in actuator shaft 100 such that the cam 106 is allowed to rotate about the axle 104, yet is retained between the cam end 108 of the actuator shaft 100 and the axle collar 122. The outside diameter of the actuator shaft 100 and cam 106 are size slightly smaller than then the inside diameter of the top opening 34 and hollow passage of the Z-shape rod 16. The difference in size between the two is usually in the range of 10 to 30 thousandths of an inch. When the actuator shaft 100 is inserted into the top opening 36 at the handle section 22, the cam 106 and the actuator shaft 100 are aligned. The actuator 14 is locked in position in the handle section 22 by twisting the actuator shaft 100 in the handle section 22. When the actuator shaft 100 is twisted, the cam 106 remains in position due to frictional forces between the inside of the handle section 22 and the cam 106. The cam 106 remains in position because of the small variation in size between the inside diameter of the handle section 22 and the outside diameter of the cam 106. As the actuator shaft 100 is twisted and the cam 106 remains in position, the shaft-cam combination in effect jams in the handle section 22, thereby locking the actuator 14 in position. The jam is effected due to the thicker portions of the cam 106 and actuator shaft 100 no longer being aligned and increasing the total diameter against the inside diameter of the handle section 22, as shown in FIGS. 19–20. To unlock the actuator 14, simply twist the actuator 14 in the opposite direction that the actuator 14 was twisted to lock the actuator 14 in position.

Figure 21:
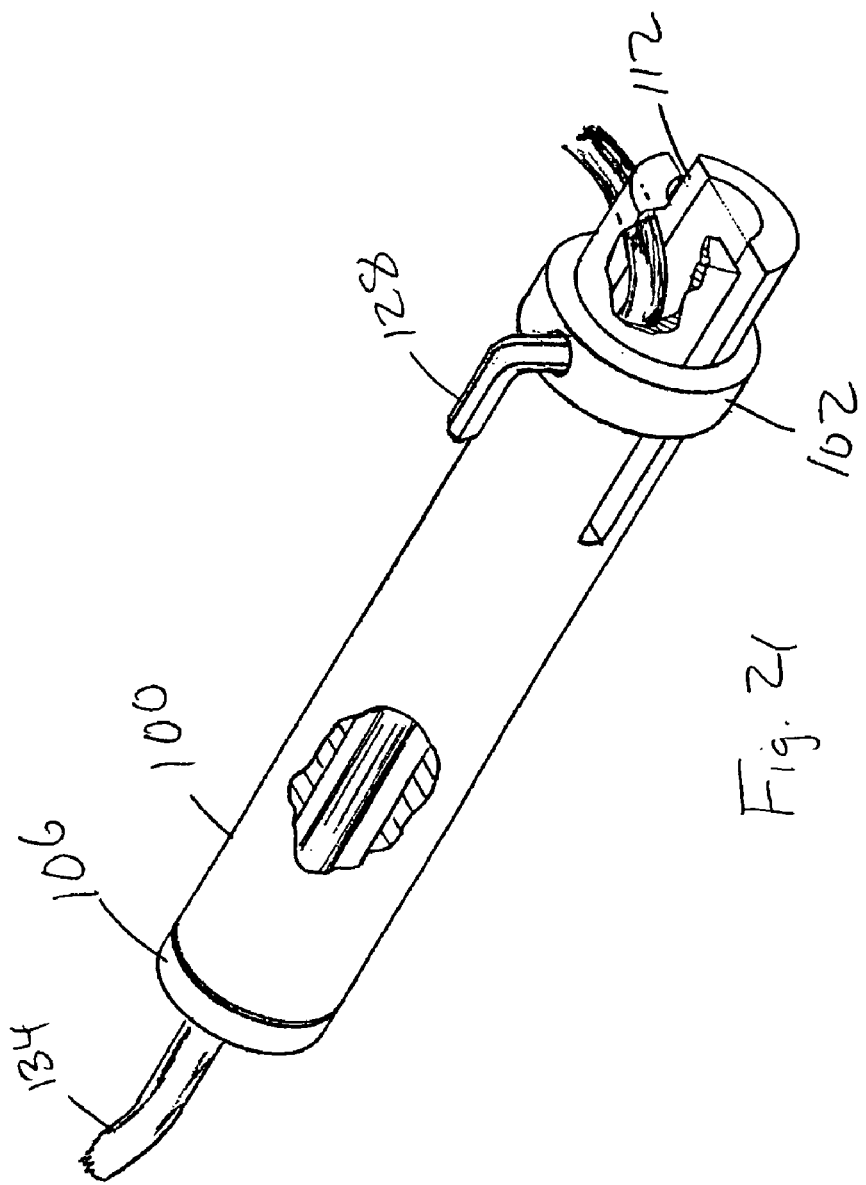
FIG. 21 is a perspective view of an another actuator according to the present invention.

FIG. 21 shows the second actuator 14 as a slightly different version of the first actuator 14 shown in FIGS. 16–20. The slot 112 in the second actuator 14 is larger near the collar end 108 of the actuator shaft 100. This allows the wiring to be routed off to the side of the actuator shaft 100, rather than out the collar end 108 of the actuator shaft 100. The other difference is that the clamping collar 102 includes a set screw handle 128 attached to the slot set screw 114. The set screw handle 128 allows the user to adjust the tension of the collar end 108 gripping the wire. Whereby, the set screw 114 attached to the handle 128 is unscrewed from the clamping collar 102 to release tension and screwed into the clamping collar 102 to increase tension. Releasing tension on the wiring allows the wiring to be fed in and out of the hollow actuator shaft 100 during use of the actuator 14. The handle 128 can be as simple as a lever as shown or could be a knob.

Figure 22:
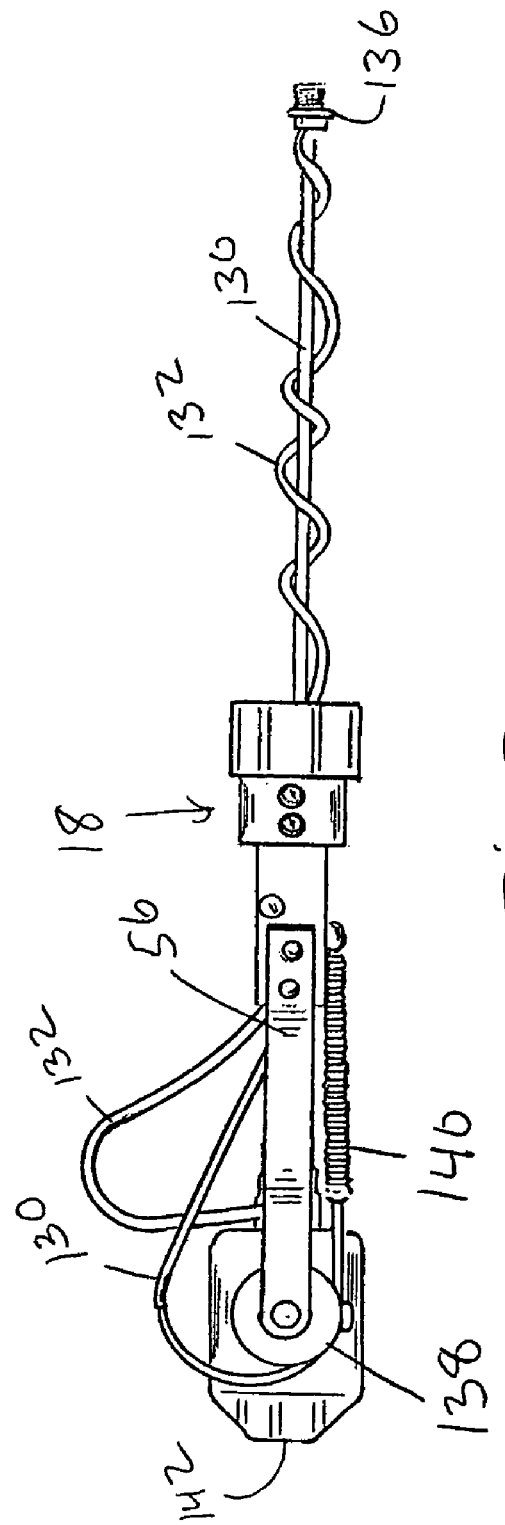
FIG. 22 is a perspective view of a camera for attachment to the camera support according to the present invention.

The use of the camera support assembly 10 and actuator 14 is as follows. The camera 12 is rotatably attached to the camera support section 26. The wiring is used to operate the camera 12. The wiring runs from the camera 12 into the bottom end 28 of the Z-shape rod 16, up through the rod passage 32 and out of the collar end 108 of the actuator shaft 100. The wiring is attached to camera 12 in such a way that the wire can be used to pull on the camera 12 and rotate the camera 12 when pulled. There are many wiring setups that can be used to employ the wiring as a means to rotate the camera 12. FIG. 22 shows one wiring setup as an example. Shown is the camera 12 attached in a straight-on position to the brackets 56. There is a spring cable 130 and camera wire 132 associated with the wiring of the camera 12. Both the camera wire 132 and the spring cable 130 are attached between the camera 12 and a terminal 136. The terminal 136 is connected to a main wire 134 shown in FIG. 21, which continues on up the rod passage 32 to the actuator 14. The spring cable 130 is connected to the camera 12 by a pulley 138 and spring 140 combination. The pulley 138 is fixed to the camera 12 and rotates with the camera 12. The spring cable 130 is fixed about and to the pulley 138 and continues on and is also attached to the spring 140. The spring 140 is connected to the bottom end 28 of the Z-shape rod 16. When the main wire 134 is pulled, the spring cable 130 is pulled and rotates the pulley 138, which in turns rotates a lens end 142 of the camera 12 upward. When the main wire 134 is released, the spring 140 pulls the pulley 138 back to it original position and hence the camera 12 back to a straight-on position. A stop (not shown) is used to retain the pulley 138 and camera 12 from rotating downward due to the tension of the spring 140.

Using the above example for the wiring setup, the main wire 134 is gripped by the actuator 14 using the clamping collar 102. The user holds the camera support assembly 10 at the handle section 22, as shown in FIG. 1. The camera 12 is slid under the vehicle by pushing the camera support assembly 10 toward the vehicle, whereby the skid plate 64 slides across the ground while supporting the camera support section 26. Once the skid plate 64 and camera 12 are under the vehicle, the camera 12 can be rotated upward from the straight-on position and/or rotate about the U-shape cutout 68. The camera 12 is rotated about the U-shape cutout 68 by moving the handle section 22 left or right, while applying pressure downward against the skid plate 64, via the support column 66. The camera 12 is rotated upward by pulling on the actuator 14, which pulls on the main wire 134. The main wire 134 pulls on the spring cable 130 connected to the camera 12 via the pulley 138. The rearward hand of the user operates the actuator 14 by pulling back on the clamping collar 102, which in turn pulls back on the main wire 134 and rotates the camera 12 upward. There are two methods of holding the camera 132 in a fixed position along the path of rotation upward from the straight-on position. The first method is to position the fingers 146 of the user between the top end 30 at the handle section 22 and the clamping collar 102, whereby the fingers 146 of the user prevent the actuator 14 from returning to a forward position.

Figure 16:
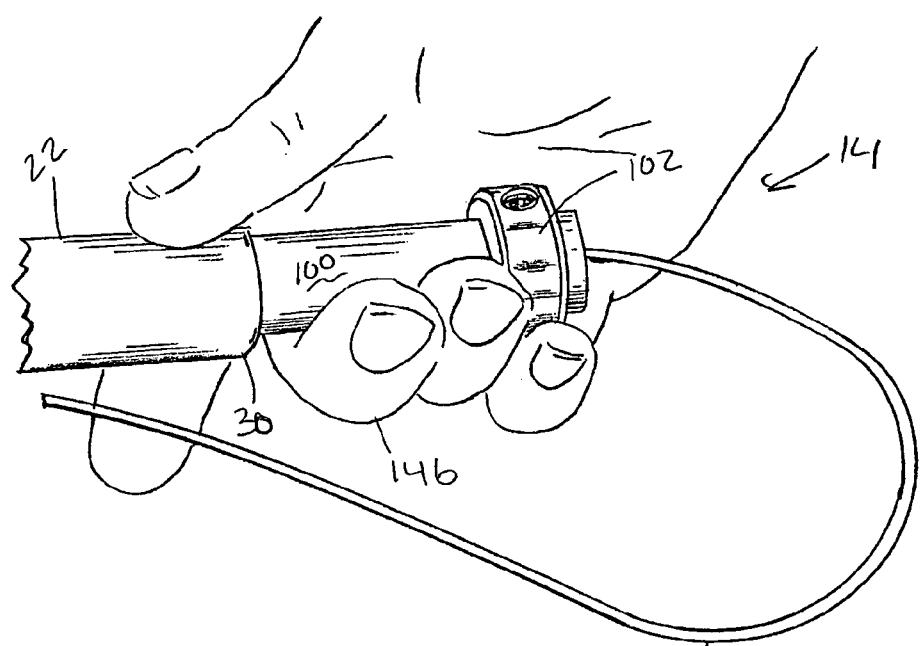
FIG. 16 is a perspective view of an actuator in a handle section according to the present invention.
Figure 17:
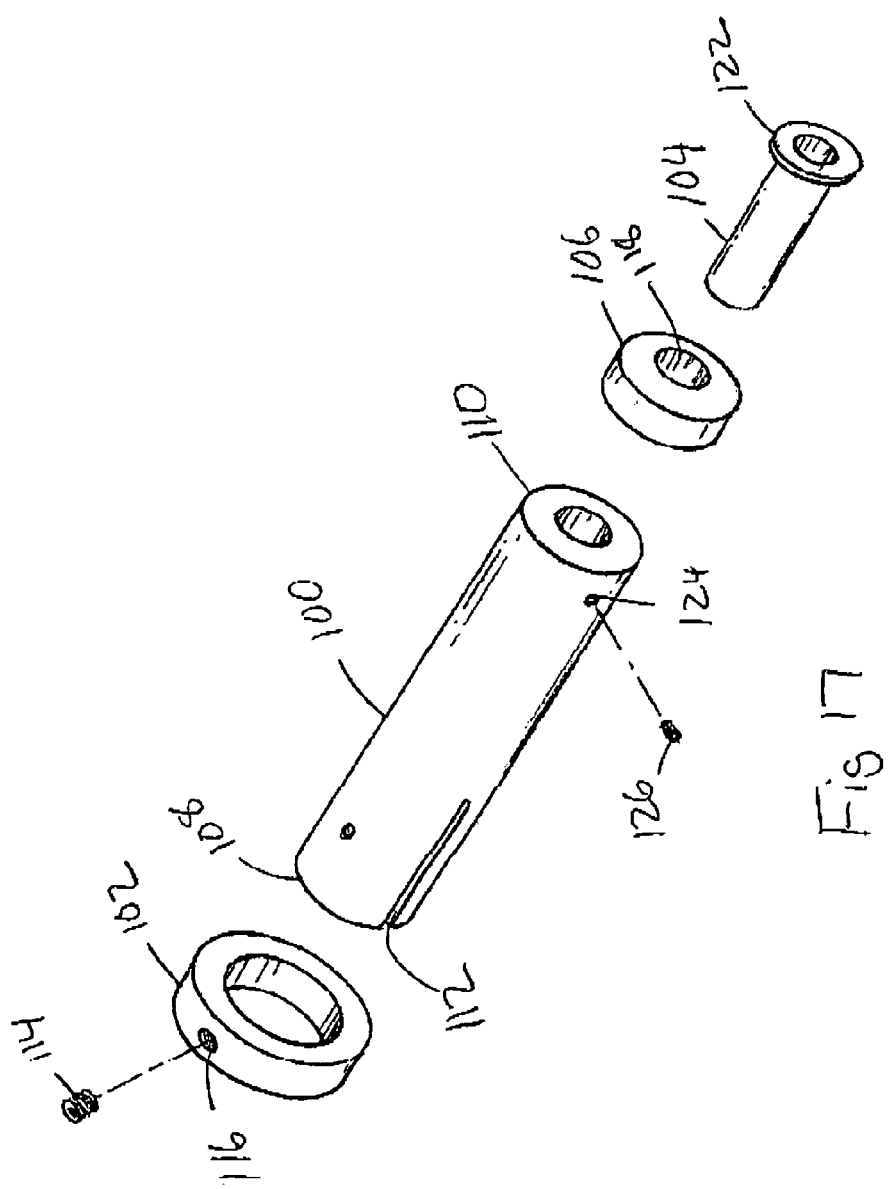
FIG. 17 is an exploded view of an actuator according to the present invention.
Figure 18:
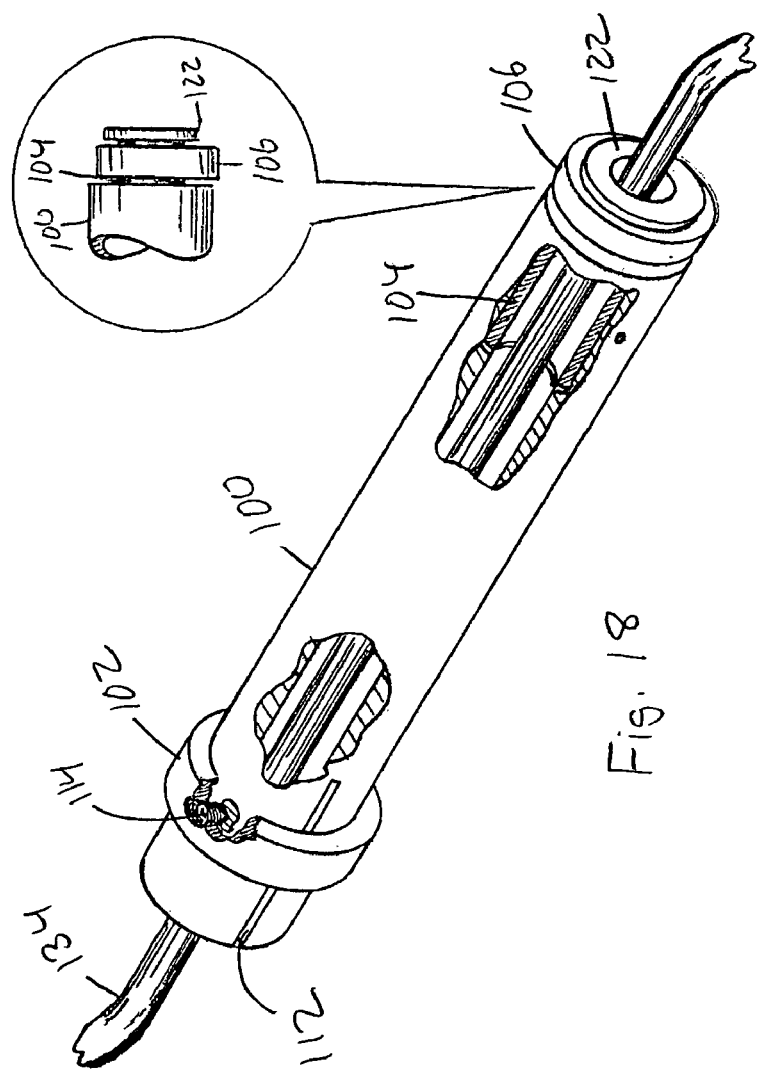
FIG. 18 is a perspective cut-a-way view of an actuator according to the present invention.

The first method is illustrated in FIG. 16. The second method is to twist the actuator 14 and invoke the cam 106 to lock the actuator shaft 100 in position inside the handle end 22 of the Z-shape rod 16. The use of actuator 14 as described above allows the user to move and control the Z-shape rod 16, while moving the actuator 14.

It is also possible to use a fixed position camera 12 with the Z-shape rod 16. This configuration would include camera 12 fixed in position, whereby the actuator 14 would not be needed. The camera 12 would be fixed to the camera support 18 at the desired angle. The camera 12 could be mounted to the camera support 18 such that the fixed position is adjustable prior to use.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A camera support comprising:
   a Z-shape rod having a handle section at a top, a camera support section at a bottom and a middle section between said handle and camera support sections, said handle and camera support sections being approximately parallel to a surface and said middle section extending upward from said camera support section to said handle section;
   a camera mounted to said camera support section;
   a skid plate attached to a bottom of said camera support section to support said camera support section above said surface and allow said camera support section to slide over said surface, said skid plate including a top surface and a bottom surface, said top surface attached to said bottom of said camera support section, said bottom surface configured to be in direct contact with and slide over said surface; and
   an actuator mounted on said handle section to cause movement of said camera.

2. The camera support of claim 1, wherein said Z-shaped rod is two pieces and separates along said middle section.

3. The camera support of claim 2, wherein said two pieces are configured to be assembled ill multiple positions in relation to each other.

4. The camera support of claim 1, wherein said skid plate is a round plate with an upright edge.

5. The camera support of claim 4, wherein there is a radiused transition between said round plate and said upright edge.

6. The camera support of claim 4, wherein there is a bell shaped upright edge emanating said round plate.

7. The camera support of claim 1, further including a caster wheel attached to said camera support section near an intersection of said middle section and said camera support section, said wheel caster used to counteract forces applied to said intersection during movement.

8. A camera support comprising:
   a Z-shape rod having a handle section at a top, a camera support section at a bottom and a middle section between said handle and camera support sections, said handle and camera support sections being approximately parallel to a surface and said middle section extending upward from said camera support section to said handle section;
   a camera mounted to said camera support section;
   a skid plate attached to a bottom of said camera support section to support said camera support section above said surface and allow said camera support section to slide over said surface;
   a support column between said camera support section and said skid plate; and
   an actuator mounted on said camera section to cause movement of said camera.

9. The camera support of claim 8, wherein said support column is at a center of said skid plate; and wherein said support column includes a U-shaped cutout to cradle camera support section.

10. The camera support of claim 9, wherein said camera support section is rotatably attached in said U-shaped cutout of said support column.

11. The camera support and actuator of claim 8, wherein said skid plate includes offset angled casters mounted to said skid plate to allow movement of said skid plate along said surface.

12. The camera support of claim 11, further including a caster wheel attached to said camera support section near an intersection of said middle section and said camera support section, said wheel caster used to counteract forces applied to said intersection during movement.

13. The camera support of claim 11, wherein said skid plate is in a shape of an inverted wing; wherein said shape includes a middle section, two outside sections and two angle sections; wherein said middle section is connected to said outside sections by said angled sections such that said middle section is lower than said outside sections; wherein said offset angled casters are mounted to said outside sections; and wherein said camera support section is connected to said middle section of said skid plate.

14. The camera support of claim 13, further including a caster which attached to said camera support section near an intersection of said middle section and said camera support section, said wheel caster used to counteract forces applied to said intersection during movement.

15. A camera support comprising:
   a Z-shape rod having a handle section at a top, a camera support section at a bottom and a middle section between said handle and camera support sections, said handle and camera support sections being approximately parallel to a surface and said middle section extending upward from said camera support section to said handle section;
   a camera mounted to said camera support section; and
   an actuator mounted on said handle section to cause movement of said camera, said actuator is a shaft internal to said handle section of said Z-shaped rod and connected to said camera by a cable to cause movement of said camera; and wherein said shaft includes a handle to allow said shaft to be push and pulled inside said handle section to control movement of said camera.

16. The camera support of claim 15, wherein said shaft includes a collar end and a cam end; wherein said cam end is closest to said camera; wherein said cam end includes a cam rotatably attached to said cam end; wherein said cam has an outside diameter rotatably positioned offset from a center of an outside diameter of said shaft; and wherein said outside diameters of said shaft and cam are size slightly smaller than an inside diameter of said handle section such that by twisting said shaft in said handle section, said cam remains in position due to frictional forces between said inside diameter of said handle section and said cam and in effect jams said shaft in a locked position with said handle section.

17. The camera support of claim 16, wherein said shaft is hollow to allow a camera cable to pass; wherein said collar end includes a slot; and further including a fastener to squeeze said collar end together at said slot to bold said camera cable in position.

18. The camera support of claim 17, further including a collar which is attached over said collar end to act as a handle and a fastener.

19. The camera support of claim 18, further including an adjustment handle on said collar end to allow quick release of pressure applied by said collar on said shaft.

20. The camera support of claim 15, further including a caster wheel attached to said camera support section near an intersection of said middle section and said camera support section, said wheel caster used to counteract forces applied to said intersection during movement.

21. A camera support comprising:
   a Z-shape rod having a handle section at a top, a camera support section at a bottom and a middle section between said handle and camera support sections, said handle and camera support sections being approximately parallel to a surface and said middle section extending upward from said camera support section to said handle section;
   a camera mounted to said camera support section;
   an actuator mounted on said handle section to cause movement of said camera said actuator including a shaft internal to said handle section of said Z-shaped rod and connected to said camera by a cable to cause movement of said camera, and including a handle to allow said shaft to be push and pulled inside said handle section to control movement of said camera; and
   a skid plate attached to a bottom of said camera support section to support said camera support section above said surface and allow said camera support section to slide over said surface.

22. The camera support of claim 21, wherein said skid plate is a round plate with an upright edge.

23. The camera a support of claim 21, wherein said skid plate is in a shape of an inverted wing; wherein said shape includes a middle section, two outside sections end two angle sections; wherein said middle section is connected to said outside sections by said angled sections such that said middle section is lower than said outside sections; wherein said offset angled casters are mounted to said outside sections; and wherein said camera support section is connected to said middle section of said skid plate.

24. The camera support of claim 23, further including a caster wheel attached to said camera support section near an intersection of said middle section and said camera support section, said wheel caster used to counteract forces applied to said intersection during movement.

25. The camera support of claim 21, wherein said shaft includes a collar end and a cam end; wherein said cam end is closest to said camera; wherein said cam end includes a cam rotatably attached to said cam end; wherein said cam has an outside diameter rotatably positioned offset from a center of an outside diameter of said shaft; wherein said outside diameter of said shaft and cam are size slightly smaller than an inside diameter of said handle section such that by twisting said shaft in said handle section, said cam remains in position due to frictional forces between said inside diameters of said handle section and said cam and in effect jams said shaft in a locked position with said handle section; wherein said shaft is hollow to allow a camera cable to pass; wherein said collar end includes a slot; and including a collar to squeeze said collar end together at said slot to hold said camera cable in position.

26. The camera support of claim 21, further including a caster wheel attached to said camera support section near an intersection of said middle section and said camera support section, said wheel caster used to counteract forces applied to said intersection during movement.

* * * * *